May 4, 1926.

A. M. LEONI 1,583,058

DRIVE UNIT

Filed March 22, 1922

Inventor
A. M. Leoni
By
Attorney

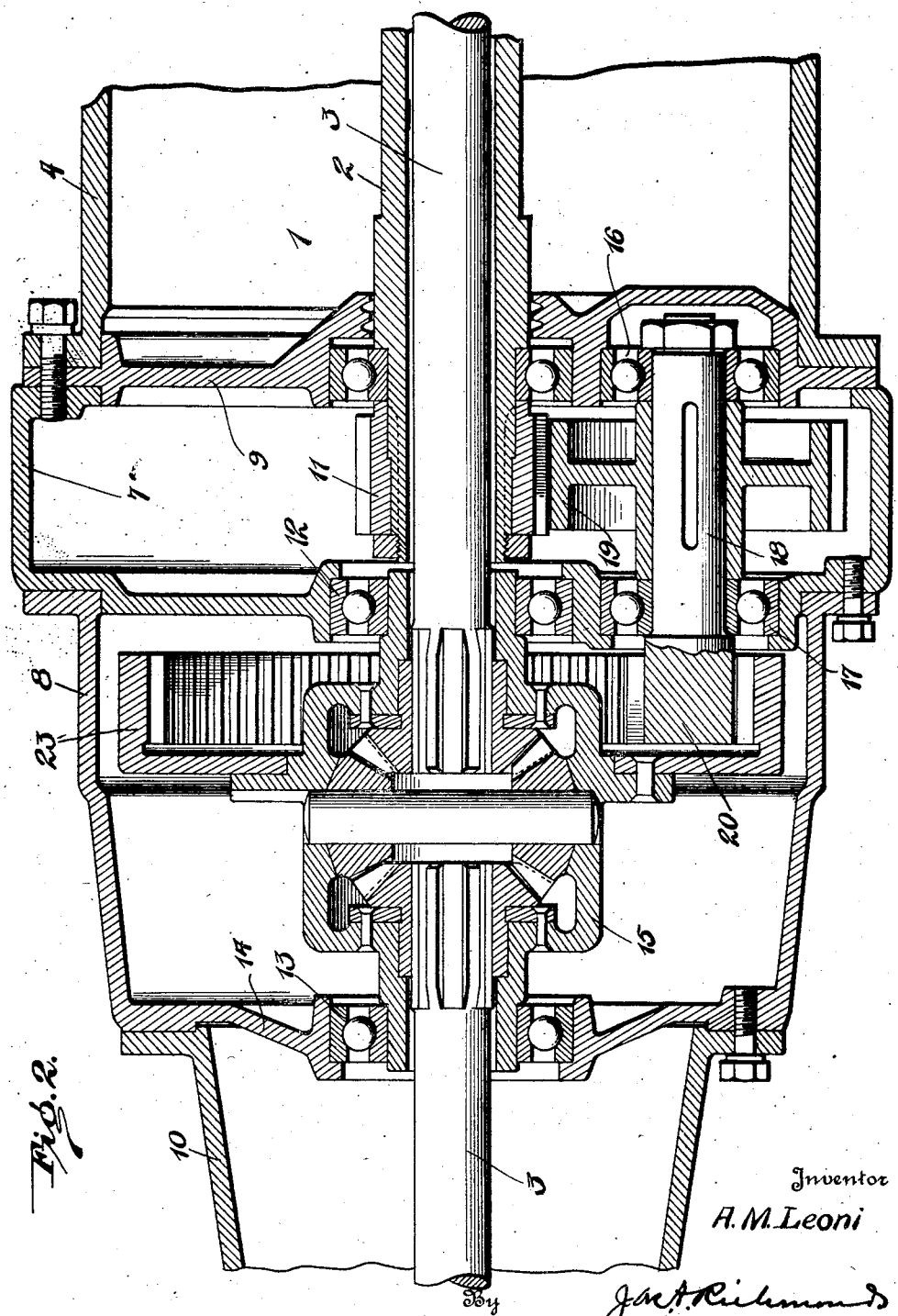

Patented May 4, 1926.

1,583,058

UNITED STATES PATENT OFFICE.

ALFONSO M. LEONI, OF PHILADELPHIA, PENNSYLVANIA, ASSIGNOR TO ELECTRO-MOTIVE DEVICES, INC., OF PHILADELPHIA, PENNSYLVANIA, A CORPORATION OF NEW JERSEY.

DRIVE UNIT.

Application filed March 22, 1922. Serial No. 545,801.

*To all whom it may concern:*

Be it known that I, ALFONSO M. LEONI, a citizen of the United States, residing at Philadelphia, in the county of Philadelphia and State of Pennsylvania, have invented certain new and useful Improvements in Drive Units, of which the following is a specification.

The invention relates more particularly to drive units for automotive vehicles.

Principal objects of the invention are to provide a drive unit in which all bevel gears are eliminated, thereby insuring perfect balance, freedom from torsional twists and strains, with a resultant high efficiency of power transmission; to provide a center line supported motor and differential with the latter independent of the motor other than through an intermediate driving connection, whatever that may be; to provide an axle construction in which the motor being a self-contained unitary part of the axle is always parallel to the line of drive thus obviating the use of the torque arms, truss rods, or their equivalents; to provide a simple, light and efficient self-contained drive unit free from undesirable overhangs; and to provide a drive unit of comparatively inexpensive construction which will effectively take care of variable loads and variable gear reductions.

The invention comprehends a motor having a rotating element, and a final drive including a differential having an operative connection with said rotating element. It further comprehends a rotary driving element, speed reduction gearing directly coupled therewith, and a final drive including a differential responsive to the speed allowance of the intermediate gearing. It further comprehends a rotary driving element, speed reduction gearing directly coupled therewith, a final drive including a differential responsive to the speed allowance of the intermediate gearing, and a center line support for the drive element, differential, and jack shafts. It further comprehends other features of novelty and utility which will be considered at large and in detail in the course of the following description, reference being had to the accompanying drawings, forming a part hereof in which—

Fig. 2 is a similar view showing a slightly modified arrangement between the reduction gearing and the differential.

Figure 1:
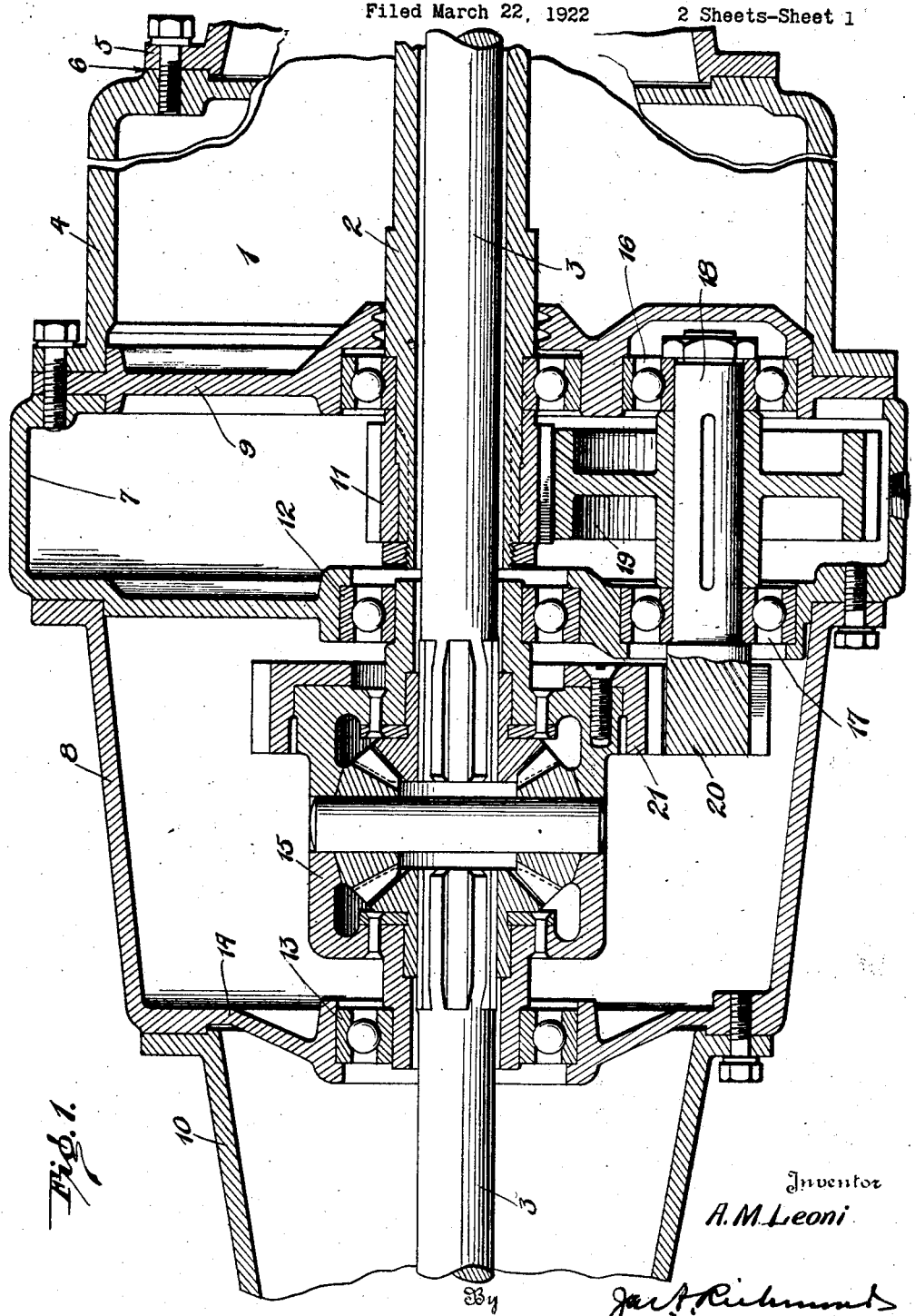
Figure 1 is a sectional view of a drive unit constructed in accordance with the present invention.

I have chosen to illustrate the invention as applied to an electric driven vehicle, as being of special advantage and utility in connection therewith although, as indicated at the outset, it is not so restricted and motors other than electric motors may be employed.

The electric motor 1 of any approved type has a hollow shaft 2 which is traversed by one of the differential-driven jack shafts 3. The motor casing 4 forms a part of the axle housing or sleeve assembly of which one section 5 is directly secured to the motor casing, as at 6. A gear case is secured to the opposite side of the motor casing and likewise constitutes a part of the axle assembly.

The motor gear case is made in two parts 7 and 8, the former being connected to a removable end plate 9 of the motor casing and having a diameter sufficient for the first reduction gear, while the section 8 is secured to the end wall or flange of the first section and serves to house the differential and second reduction gear. The remaining axle housing sleeve 10 is connected directly to the gear case section 8. For the convenience of the following description and claims that part of the sleeve assembly indicated by the numeral 4 will be termed the motor casing; that part indicated at 7 will be termed the gear case; and that part indicated at 8 will be termed the differential case.

The above parts are merely illustrative of details necessary to an understanding of the invention, which accounts for the more or less conventional showing.

The hollow shaft 2 extends into gear case section 7 and is there provided with a pinion 11. The wall of the casing section 7 remote from the motor is formed with an opening to receive a bearing 12, a similar bearing 13 being provided in the end wall of the complemental section 8.

The bearings 12 and 13 are so arranged that the differential housing 15 supported thereby is axially aligned with the motor shaft.

Opposed bearings 16 and 17 are provided in the end wall 9 of the motor casing and in the end wall of gear case section 7 to receive a journal 18 having a first reduction gear 19 arranged between the bearings and co-operating with the driving pinion 11, the end of the journal having a second reduction gear 20.

In Fig. 1, which illustrates a construction particularly adapted for small speed reductions, the second reduction gear meshes with a gear 21 formed exteriorly on the differential housing; while in Fig. 2, which illustrates an embodiment suitable for large speed reductions, the second reduction gear co-operates with an internal gear 23 carried by an annular member removably secured to the differential housing.

It will be noted that while the differential has a center line support in common with the motor, or in other words is coaxial with the motor, it is wholly independent of direct connection with the power delivery element of the motor and is driven through an intermediate source shown by way of example as a reduction gear. Some of the advantages which result from this construction and arrangement have hereinbefore been referred to and others will be obvious to those skilled in the art.

The driving means, here shown and described as an electric motor, may obviously be any desired type of power delivery means wherein a rotating part serves as a driver; and the type of gearing between the motor and differential is a matter of choice.

Having described the nature and objects of my invention, I claim:—

1. A drive unit including a rear axle assembly including a motor casing, a gear case, and a differential housing alined in such assembly, each being divided from the others by closures for the part, a differential having bearing in two such closures, a motor shaft having bearing in another of such closures to maintain alinement, a first reduction arranged in the gear case and driven from the motor shaft, and a second reduction arranged in the differential housing and driven from the first reduction with the driving element having bearing in two such closures.

2. A drive unit, an electric motor, reduction gearing directly coupled with the motor shaft, a final drive including a differential and a reduction gearing directly coupled to the first-mentioned reduction gearing, fixed bearing plates between the first-mentioned reduction gearing and the final drive and beyond such gearing and drive, bearings in two of such plates to support the final drive in line with the motor shaft, and bearings in two of such plates to support the coupling connections between the reduction gearings.

3. In a vehicle drive unit, a motor, a casing therefor, a gear case closed against the motor casing, and a differential casing closed against the gear case, a motor in the motor casing, a hollow shaft from the motor extending through the closure between the motor casing and gear case and having bearing therein, a differential arranged in the differential casing and having bearing in the closure between such casing and the gear case and a further bearing in the end of the differential casing, a differential shaft extending through the hollow motor shaft, and coupled reduction gearings arranged in the gear case and differential casing.

In testimony whereof I affix my signature.

ALFONSO M. LEONI.